June 10, 1930.  E. A. WILLIAMS  1,762,648
ROTARY CUTTER
Filed Nov. 6, 1929

Inventor
E. A. Williams
By Clarence A. O'Brien
Attorney

Patented June 10, 1930

1,762,648

UNITED STATES PATENT OFFICE

ERNEST ALBERT WILLIAMS, OF ELYRIA, OHIO

ROTARY CUTTER

Application filed November 6, 1929. Serial No. 405,140.

This invention relates broadly to the art of woodworking and has more particular reference to an especially constructed rotary cutter such as is employed for dadoing, cutting, rabbeting and grooving across or with the grain of the wood.

The present invention embodies certain refinements and improvements upon a similar rotary cutter covered in Patent No. 1,725,238 granted to me under date of August 20, 1929.

Generically considered, the novelty is predicated upon a flat substantially disk-like plate having a centrally located arbor opening and having circumferentially spaced peripheral portions with which tangential blades are associated with their cutting ends arranged in cooperative relationship for accomplishing work of the character above stated.

In the patented structure, I provide longitudinally curved cutting blades whose adjacent ends are disposed in circumferentially spaced relationship. Moreover I provide curvate notches in the periphery of the plates and arrange the cutting ends of the blades to project into these notches.

In the present device, I provide circumferentially spaced radial pointed projections joined together through the medium of straight edge portions, and mount flat blades on these straight edge portions, so that the blades project either to one or the other or both sides of the plate.

Novelty is also predicated upon the arrangement wherein the cutting ends of the blades overlie the butt ends of the adjacent blades in radially spaced relationship to provide for a more continuous and successful cutting action.

In the drawings:—

Figure 1:
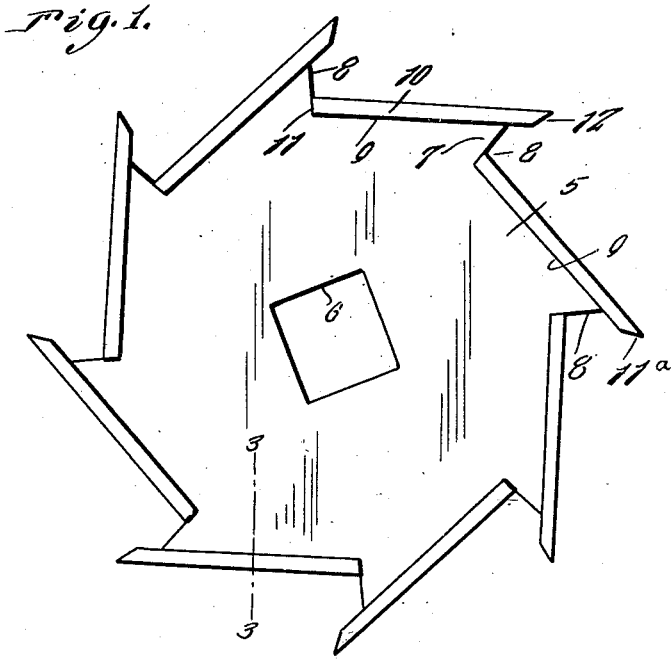
Figure 1 is a side or face view of a rotary cutter constructed in accordance with the present invention.
Figure 2:
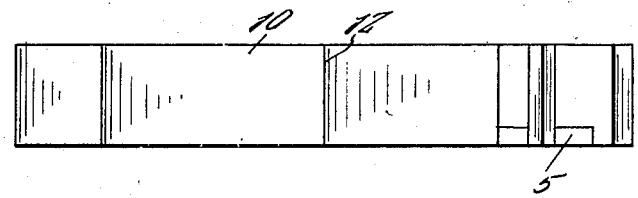
Fig. 2 is a top plan view of the same.

Referring now to the drawings by reference numerals, it will be seen that the reference character 5 designates a plate. This is of somewhat circular form and has a centralized arbor hole or opening at 6. By preference, this is of general diamond-shaped configuration. The peripheral portion of the plate is formed with tooth-like or pointed projections 7. These portions 7 include radial straight edges which may be defined as abutments 8, and the respective abutments are circumferentially spaced from each other by a substantially straight edge portion as at 9.

The blades 10 are in the nature of substantially rectangular plates of flat form, which rest on and are welded to the edges 9 so that the butt ends 11 engage the abutments while the beveled cutting edges 11$^a$ project beyond the abutments and overlying the butt ends of the adjacent blades.

In other words, the butt 11 engages a companion abutment 8 and the opposite beveled cutting edge 11$^a$ projects beyond the next circumferentially spaced abutment and overlies the butt of the next adjacent blade in circumferentially radially spaced relation. The overhanging portion of the cutting edge is disposed at an acute angle with respect to the outer surface of the adjacent butt.

Figure 3:
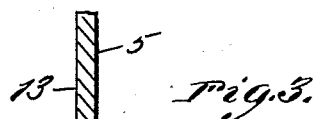
Fig. 3 is a sectional view taken approximately on the plane of the line 3—3 of Fig. 1.
Figure 4:
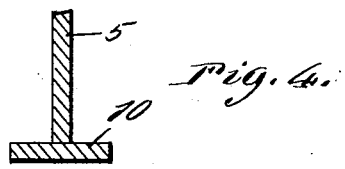
Fig. 4 is a similar view showing the plate disposed at the center of the blades with half portions of the blades projecting simultaneously beyond opposite faces of the plate.

The arrangement is such that the blades may be welded so that one edge is flush or in a plane with the outer surface 12 of the plate as seen in Fig. 3. In the arrangement shown in Fig. 4 however, the plate is welded to the central portion of the blade, so that the opposite half portions thereof project equally beyond the opposite faces of the plate.

It is thought that by carefully considering a description in connection with the drawings, a clear understanding of the invention will be had. Therefore, a more lengthy description is regarded as unnecessary.

Minor changes in shape, size, and rearrangement of elements coming within the field of invention claimed may be resorted to in actual practice of desired.

Having thus described my invention, what I claim as new is:—

A rotary cutter for wood working purposes comprising a flat substantially disk like plate of relatively thin metal having a central arbor opening and having its peripheral portion formed with a series of circumferentially disposed pointed projections each of which has a forwardly disposed straight edge extending radially of the plate and an upper substantially straight edge disposed tangentially of the plate, said projections being arranged so that the radial edge of each projection provides an abutment at the lower end of the tangentially disposed upper edge of the preceding projection, a flat substantially elongated rectangular plate mounted on the tangentially disposed upper edge of each projection with one or both side longitudinal edges thereof disposed outwardly of the side faces of the disk like plate and having its inner end engaged with an abutment and its outer end projecting beyond the radial edge of the supporting projection and beveled on its inner face to provide an outwardly disposed cutting edge.

In testimony whereof I affix my signature.

ERNEST ALBERT WILLIAMS.